US012587824B2

(12) United States Patent (10) Patent No.: US 12,587,824 B2
Raval et al. (45) Date of Patent: Mar. 24, 2026

(54) 5G STAND ALONE (SA) RADIO ACCESS NETWORK (RAN) WITH EVOLVED PACKET CORE (EPC)

(71) Applicant: Parallel Wireless, Inc., Nashua, NH (US)

(72) Inventors: Kartik Shashikant Raval, Pune (IN); Amit Ghadge, Pune (IN); Pratik Vinod Mehta, Pune (IN); Rishabh Puri, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/933,925

(22) Filed: Jul. 20, 2020

(65) Prior Publication Data

US 2021/0022059 A1 Jan. 21, 2021

Related U.S. Application Data

(60) Provisional application No. 62/876,264, filed on Jul. 19, 2019.

(51) Int. Cl.
*H04W 8/02* (2009.01)
*H04W 48/18* (2009.01)
*H04W 88/16* (2009.01)

(52) U.S. Cl.
CPC ............. *H04W 8/02* (2013.01); *H04W 48/18* (2013.01); *H04W 88/16* (2013.01)

(58) Field of Classification Search
CPC ... H04W 36/14; H04W 36/0022; H04W 8/02; H04W 48/18; H04W 88/16; H04W 92/02; H04W 88/14; H04W 24/04
USPC .................................. 370/331; 455/436–445
See application file for complete search history.

(56) References Cited

U.S. PATENT DOCUMENTS

| | | | |
|---|---|---|---|
| 10,367,677 B2 | 7/2019 | Parkvall et al. | |
| 10,630,410 B2 | 4/2020 | Parkvall et al. | |
| 2010/0317378 A1* | 12/2010 | Fang | H04W 36/0022 |
| | | | 455/466 |
| 2018/0220339 A1* | 8/2018 | Arora | H04W 36/0022 |
| 2019/0215691 A1* | 7/2019 | Salkintzis | H04W 12/069 |
| 2019/0253944 A1* | 8/2019 | Kim | H04W 36/0072 |
| 2020/0100137 A1* | 3/2020 | Panchal | H04W 48/18 |
| 2021/0058748 A1* | 2/2021 | Liao | H04W 76/11 |
| 2021/0112491 A1* | 4/2021 | Chen | H04W 8/20 |
| 2021/0136859 A1* | 5/2021 | Yoo | H04W 88/06 |

* cited by examiner

*Primary Examiner* — Michael Y Mapa
(74) *Attorney, Agent, or Firm* — Michael Y. Saji

(57) ABSTRACT

Systems, methods and computer software are disclosed a 5G mobile network. In one embodiment a method is disclosed, comprising: providing a 5G standalone (SA) base station; providing an Interworking Function (IWF) in communication with the 5G SA base station; providing an Evolved Packet Core (EPC) in communication with the IWF; and functioning, by the IWF, as an Access and Mobility Management Function (AMF) to the 5G SA base station and functioning as a Mobility Management Entity (MME) towards the EPC.

13 Claims, 10 Drawing Sheets

5G STAND ALONE (SA) RADIO ACCESS NETWORK (RAN) WITH EVOLVED PACKET CORE (EPC)

CROSS-REFERENCE TO RELATED APPLICATIONS

This application claims priority under 35 U.S.C. § 119(e) to U.S. Provisional Pat. App. No. 62/876,264, filed Jul. 19, 2019, titled "5G Mobile Network Solution with 5G Stand Alone (SA) Radio Access Network (RAN) with Evolved Packet Core (EPC) Solution" which is hereby incorporated by reference in its entirety for all purposes. This application also hereby incorporates by reference, for all purposes, U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. pat app. Ser. No. 14/777,246, "Methods of Enabling Base Station Functionality in a User Equipment," filed Sep. 15, 2016; U.S. pat. app. Ser. No. 14/289,821, "Method of Connecting Security Gateway to Mesh Network," filed May 29, 2014; U.S. pat. app. Ser. No. 14/642,544, "Federated X2 Gateway," filed Mar. 9, 2015; U.S. pat. app. Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. pat. app. Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and 15/713,584 (PWS-71850US03). This application also hereby incorporates by reference in their entirety U.S. pat. application Ser. No. 16/424,479, "5G Interoperability Architecture," filed May 28, 2019; and U.S. pat. application Ser. No. 16/927, 988, "5G Mobile Network with Intelligent 5G Non-Standalone (NSA) Radio Access Network," filed Jul. 12, 2020; and U.S. Provisional Pat. Application No. 62/804,209, "5G Native Architecture," filed Feb. 11, 2019; and U.S. Provisional Pat. App. No. 62/900,647, "4G/5G Core Interworking," filed Sep. 15, 2019.

BACKGROUND 5G is the next generation mobile communication technology following 4G (Long term Evolution (LTE). 3GPP has been working on defining the standards for 5G as part of 3GPP Release 15 and 16. Starting at 1G and then followed by 2G, 3G and 4G, each generation has laid the foundation for the next generation to cater to newer use cases and verticals. 4G was the first generation that introduced flat architecture with all Internet Protocol (IP) architecture. 4G enabled and flourished several new applications and use cases. 5G is going to be not just about higher data rates but also about total user experience and is going to cater to several new enterprise use cases like industrial automation, connected cars, massive Internet of Things (IoT), and others. This will help operators to go after new revenue opportunities.

Launching a 5G network will need significant investment as it will need Radio Access Network (RAN) and packet core upgrade. 3GPP has defined a new 5G New Radio (NR) and new 5G Core. Eventually all the operators will want to head towards a complete 5G network coverage with the new 5G standalone core, given the several new features and capabilities that the new 5G standalone network brings in. But given the significant cost involved, 3GPP has defined a number of different intermediate solutions that can provide gradual migration from current 4G network to the eventual native 5G network.

SUMMARY

3GPP has proposed multiple options to enable operators to launch 5G in a graceful manner. One option is referred to as Non-Stand Alone (NSA) while another option is referred to a Stand Alone (SA).

This invention proposes a new method of deploying 5G service by deploying 5G Non-Standalone (NSA) RAN/User Equipment (UE)s with existing 4G Evolved Packet Core (EPC). This solution helps in introducing 5G NSA solution without any upgrade of existing incumbent 4G RAN. Thus, it helps in reducing the cost to deploy 5G service with 5G NSA solution by not needing to upgrade the 4G RAN, which can be very costly, time consuming and service impacting.

A system for providing a 5G mobile network is described. The system includes a 5G standalone (SA) base station, an Interworking Function (IWF) in communication with the 5G SA base station, and an Evolved Packet Core (EPC) in communication with the IWF. The IWF functions as an Access and Mobility Management Function (AMF) to the 5G SA base station and functions as a Mobility Management Entity (MME) towards the EPC.

In another embodiment, a method for providing a 5G mobile network is disclosed. The method may include providing a first base station having a first coverage area for a first Radio Access Network (RAN); providing a second base station having a second coverage area, the second coverage area within the first coverage area of the first base station for an overlay RAN; providing a 5G base station having a third coverage area, the third coverage area within the first coverage area and within the second coverage area and part of the overlay RAN; and determining, by a 5G Interworking Function (IWF) device, which subscribers are to be serviced by the overlay RAN and which subscribers are to be serviced by the first RAN.

In another embodiment, a non-transitory computer-readable medium containing instructions for providing a 5G mobile network is disclosed. The instructions, when executed, cause a system to perform steps including

DETAILED DESCRIPTION

3GPP has proposed multiple options to enable operators to launch 5G in a graceful manner. On a high level below are the two solutions using which operators to launch 5G.

Figure 1:
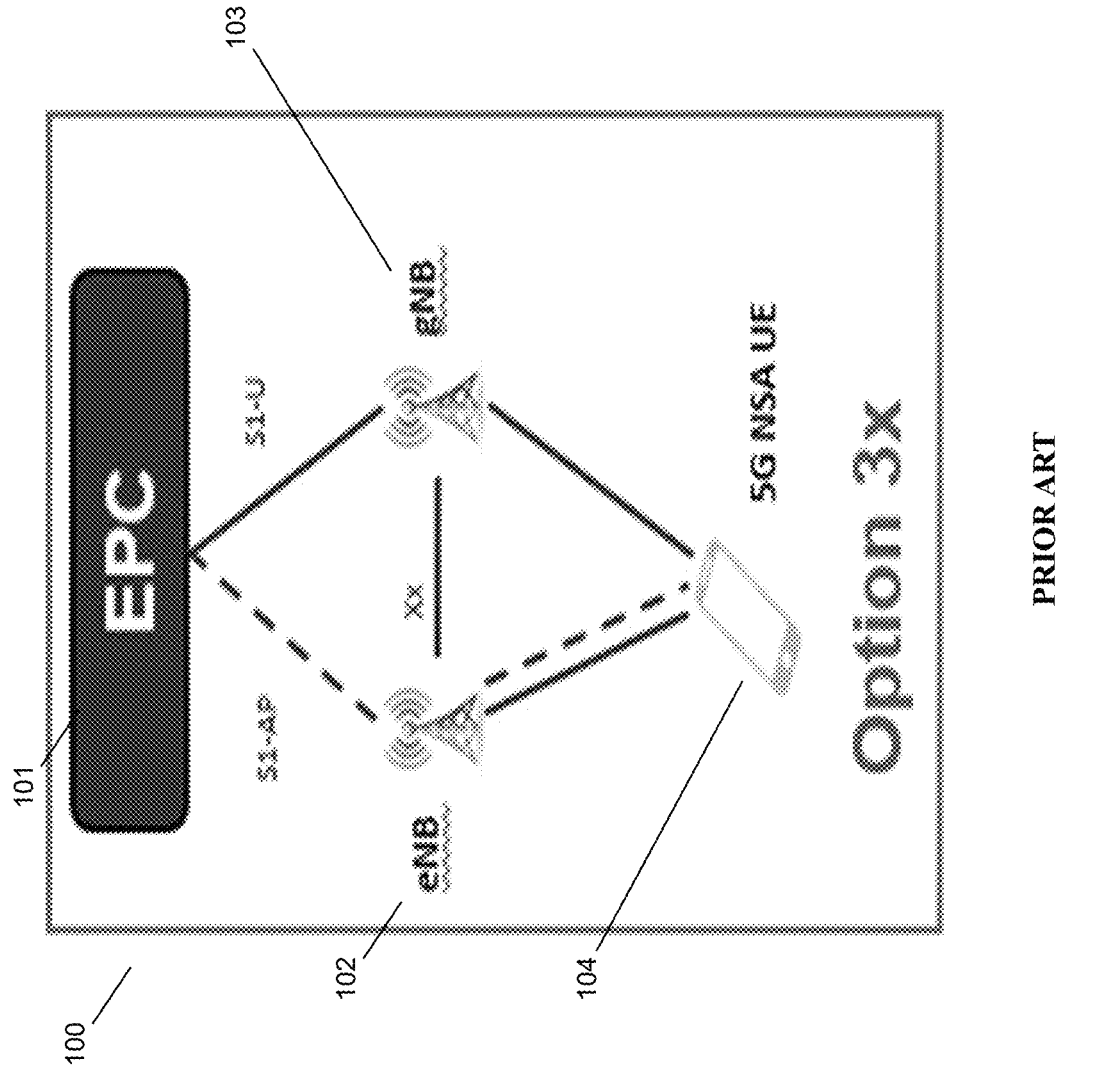
FIG. 1 is a diagram showing a 5G Non-Standalone (NSA) network.

FIG. 1 shows a prior art 5G Non-Standalone (NSA) solution 100. This solution includes an EPC 101 in communication with an eNB 102 and a gNB 103. The eNB 102 and the gNB 103 are in communication with each other. Also shown is a 5G NSA UE device 104 in communication with the eNB and the gNB. This solution allows operators to launch 5G service by anchoring 5G gNodeB to the existing EPC packet core. Thus, it helps operators to launch 5G service with minimal disruption to the existing packet core and leverage their existing investment in the current 4G network for 5G as well. 5G NSA needs 5G NSA compatible 5G devices which use 4G NAS to communicate with EPC Packet Core.

Figure 2:
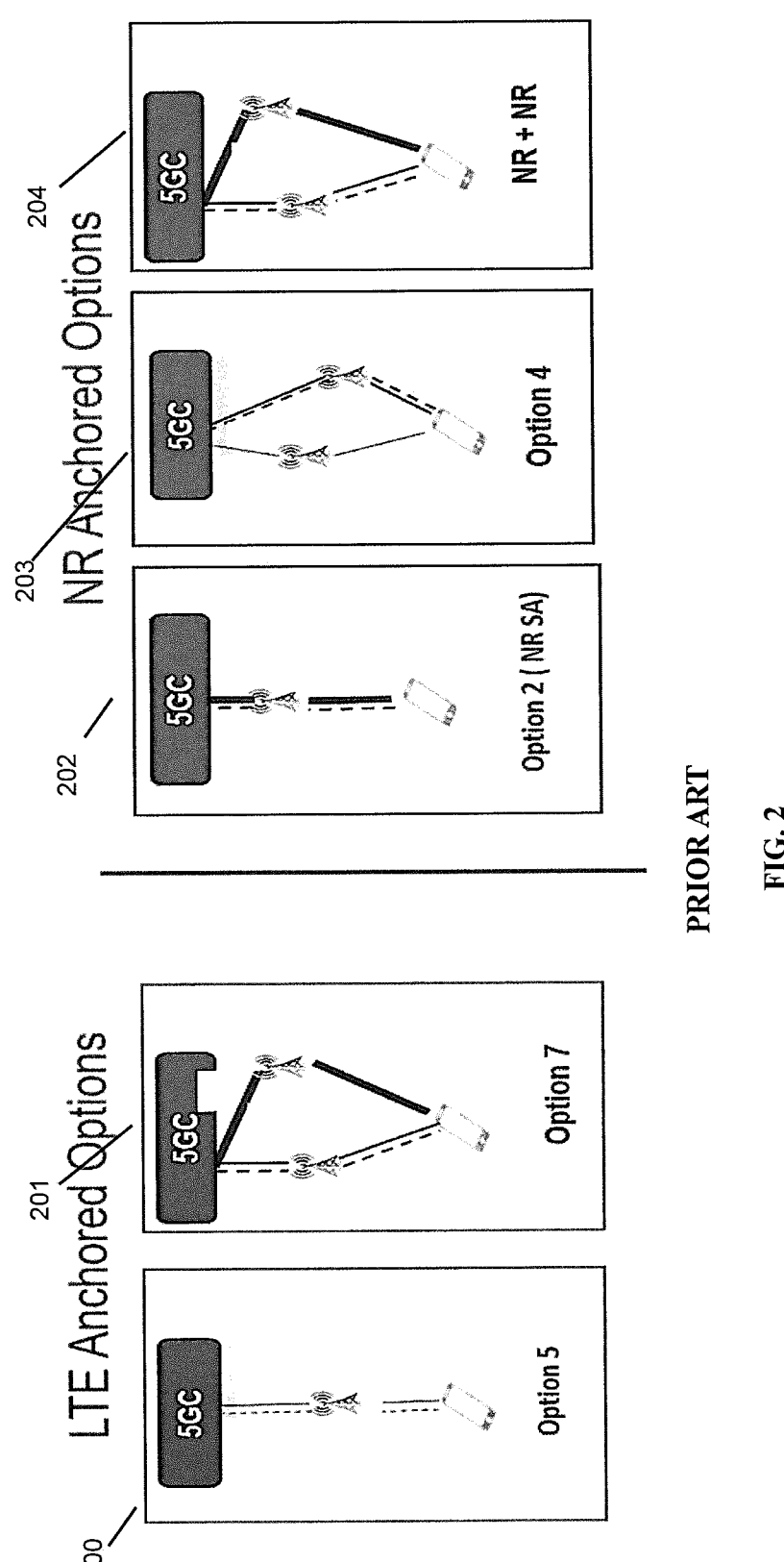
FIG. 2 is a diagram showing a 5G Standalone (SA) network.

FIG. 2 shows different 5G Standalone (SA) solutions. Solution 200 is referred to as Option 5, solution 201 is referred to as Option 7, solution 202 is referred to as Option 2 (NR SA), solution 203 is referred to as Option 4, and solution 204 is referred to as NR+NR. This solution introduces a new 5G Standalone core altogether and is an altogether new network, thus the cost/investment will be very high. 5G SA needs 5G SA compatible 5G devices which use new 5G Network Adapters (NAs) to communicate with new 5G Packet Core.

Figure 3:
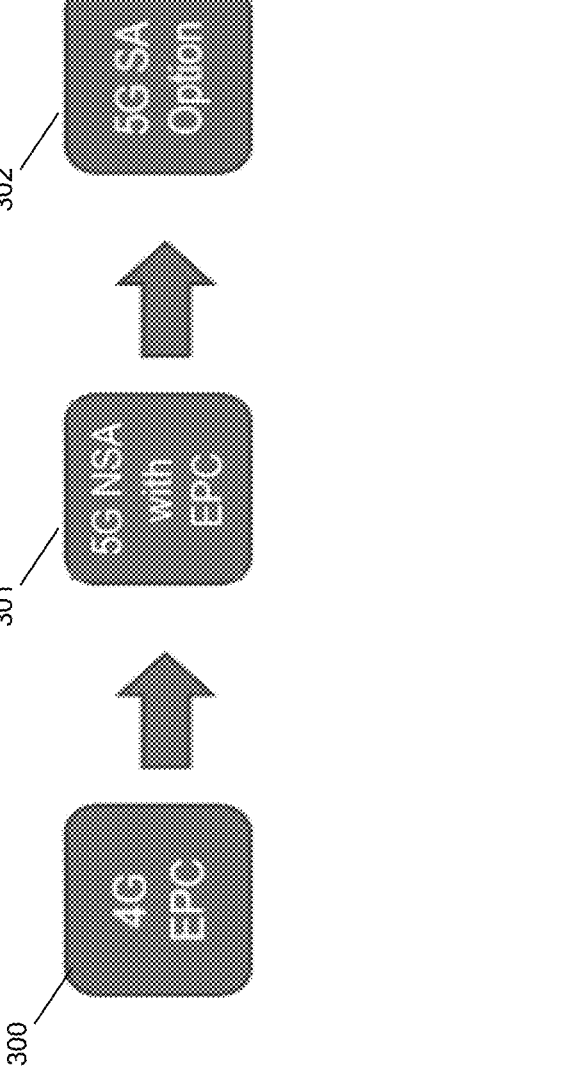
FIG. 3 is a diagram showing a migration path from 4G to 5G.

Based on this migration path normally taken by operators is as follows:

FIG. 3 shows the migration path which begins with the 4G EPC 300, then 5G NSA with EPC 301 then 5G SA option 302.

Most operators will initially launch 5G with 5G NSA to leverage their existing investment and launch 5G with minimal disruption to current network. After that they will introduce 5G SA.

Below are some of the side effects of this migration path:

Operators are stuck with incumbent RAN vendor for 5G NSA RAN due to custom X2 interfaces.

Due to above the incumbent vendor can charge a premium for 5G NSA as operators cannot have another vendor 5G NSA RAN.

Operator can't introduce other vendor 5G NSA RAN even if the other vendor solution has value add and better pricing.

Will need existing purpose-built hardware-based RAN to be upgraded, this can be costly operation.

Upgrade can lead to service disruption or impact.

A new 5G NSA RAN solution is introduced in such a way that it introduces an overlay 4G/5G NSA RAN network without any impact to the existing 4G RAN network and without any need for any support from incumbent RAN eNodeBs.

Most Operators will initially launch 5G with 5G NSA to leverage their existing investment and launch 5G with minimal disruption to current network. After that introduce 5G SA via option 2 or option 4/7.

Below are some of the side effects of this migration path:

5G NSA is primarily deployed to help operators slowly build out the 5G radio network in pockets while interworking with existing 4G EPC operation. However, to provide better experience to 5G users, the 4G EPC will need to be enhanced to latest 4G feature set which includes separation of control and user plane. This itself is a large investment for the operator and is necessary to provide enhanced experience to the 5G customers which in turn would fuel the growth of 5G to more and more pockets. Later, when the operator deploys 5G SA core network, it must still continue running two parallel Packet Core networks. One EPC for 4G Legacy UEs and another one as 5GC for new 5G SA UEs. Due to this the cost could be significantly high to build, operate and maintain the network.

Figure 4A:
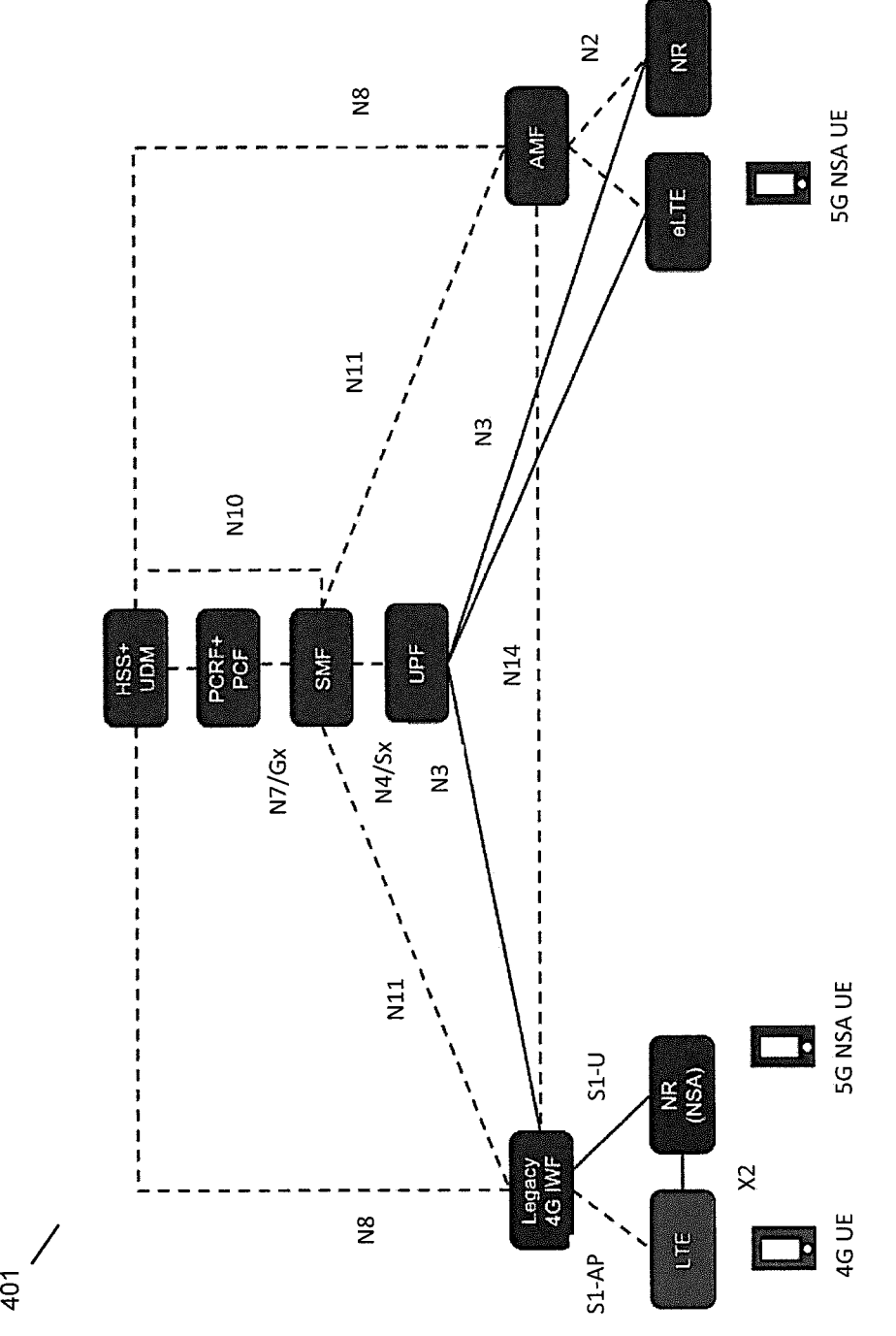
FIGS. 4A, 4B are diagrams showing a migration path from 4G to 5G, in accordance with some embodiments.
Figure 4B:
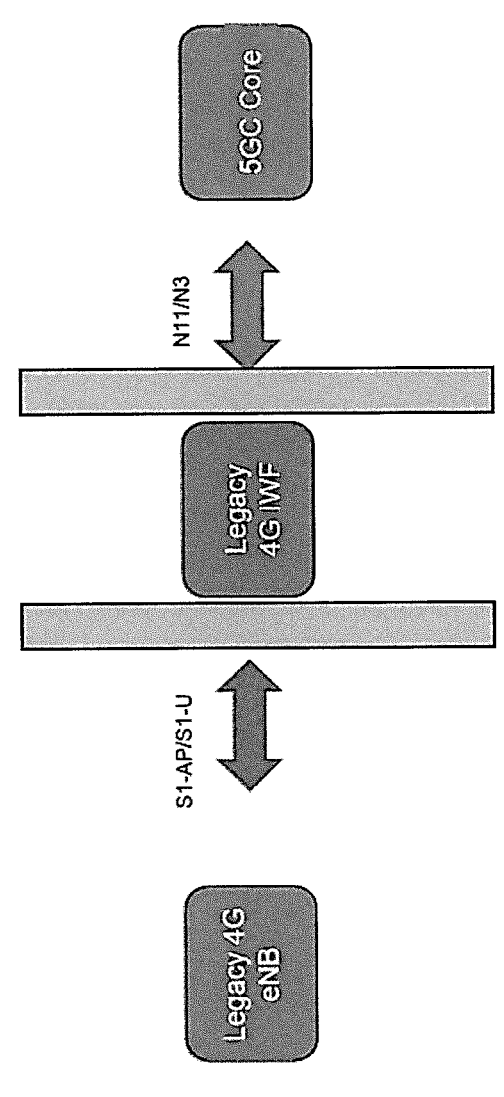
Figure 4B:
Figure 4B:
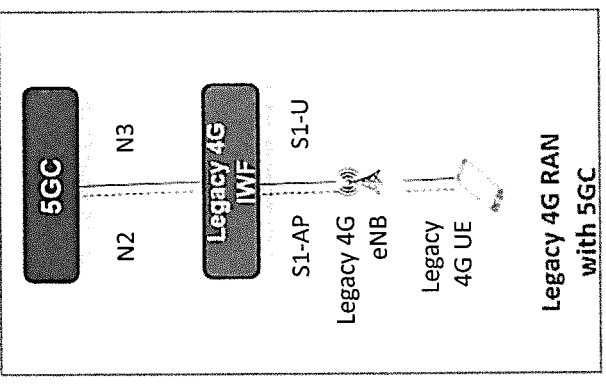

As shown in FIGS. 4A and 4B, embodiments of the present invention provide a new method to support legacy 4G/LTE UEs with the new 5GC SA Core without needing to have any Legacy EPC functions. Thus, with this solution there is no need to keep two parallel Packet Cores and instead just have 5GC as a converged Packet Core to support all the types of UEs (including Legacy 4G UEs). This solution also ensures that the existing 4G RAN network can be leveraged as is without any need to upgrade it to get it integrated with 5GC SA Core. This will help in leveraging the existing investment that Operator has made in 4G RAN solution. Also, as the industry goes through 5G NSA phase, the operator can skip any investment towards upgrading the existing 4G EPC and directly invest in 5G core which would be needed for long term.

The step of having 5G NSA gNB and UEs are eliminated and in a way optimize the migration cost towards 5G SA.

The elimination of the need for 5G NSA gNB and 5G NSA UEs and introduces a way to anchor 5G SA gNBs to the existing EPC core with minimal disruption. This solution does make use of some of the 5G NSA features defined by 3GPP in Rel 15 specs. Solution introduces an 5G SA Interworking Function (IWF) between 5G gNB and EPC core. 5G Interworking function acts as an AMF towards 5G gNB and as an MME towards EPC Core.

With this you could have a converged single 5G core for both 5G SA as well as for legacy 4G and would get the option to skip the intermediate 5G NSA solution altogether.

Advantage of this solution are: No need to have two Parallel Packet cores. Have one single converged 5GC Core to service all types of UEs. Leverage common Policy and Control infrastructure for all UEs by using common PCC infrastructure with AMF/SMF/PCF. Reduce cost by having to just maintain one single 5GC Packet core. Get rid of legacy protocols and functions in the Core network. It can allow Operators to skip intermediate 5G NSA solution altogether and thus save on the cost of 5G NSA solution and the need to keep supporting 5G NSA UEs in future.

As well, in some embodiments, a solution for providing legacy 4G with 5GC is described that introduces a new function called "Legacy 4G IWF" function. It will sit between the Legacy 4G eNB and 5GC core. This function supports following capabilities: Acts like an MME/SGW towards the Legacy 4G eNB. It will terminate the S1-AP and S1-U interfaces from Legacy 4G eNB. Acts like an AMF towards 5GC core (SMF/UPF). It will have N11 and N3 interfaces towards the SMF/UPF in the 5GC core. MME function in Legacy 4G IWF will support standards-based interfaces towards Legacy 4G eNB. Do the conversion and mapping between 4G NAS and 5G SA NAS, S-AP and N2, S1-U and N3. Handle the mapping of different parameters between 5G SA and 4G/LTE. QOS mapping, ID mappings like IMSI/SUPI, DNN/APN and so on. Mapping is defined in Annex C of 3GPP TS 23.502. Manage the handovers between multiple Legacy 4G eNB and between multiple Legacy 4G IWF for LTE to LTE handover. Legacy 4G IWF will interact with other 4G IWFs and AMFs in the 5GC using N14 interface. As per 3GPP 5G spec N14 is the interface between two AMFs. Stateful proxying may be used. Various methods and systems described in other publications incorporated herein may be used to support and enable this functionality.

On 5GC Core following support will be added: Subscriber authentication: This will help to ensure that authentication and authorization can be supported for Legacy 4G UEs using 5GC Core functions. Policy control: 5GC will provision appropriate QOS parameter for Legacy 4G UEs keeping in mind the QOS support in Legacy 4G. Charging: 5GC will generate converged charging keeping in mind the parameters available in Legacy 4G.

On 5GC the 4G Legacy UEs will be handled just like normal 5G UEs, Legacy 4G IWF will take care of mapping between the Legacy 4G params and 5G SA params. Legacy 4G UEs will always connect via the Legacy 4G eNBs and will be serviced via the 4G IWF function and anchored in 5GC. 5G SA UEs will continue to be serviced by the standard eLTE/5G SA gNB and the standard 5GC.

Figure 5:
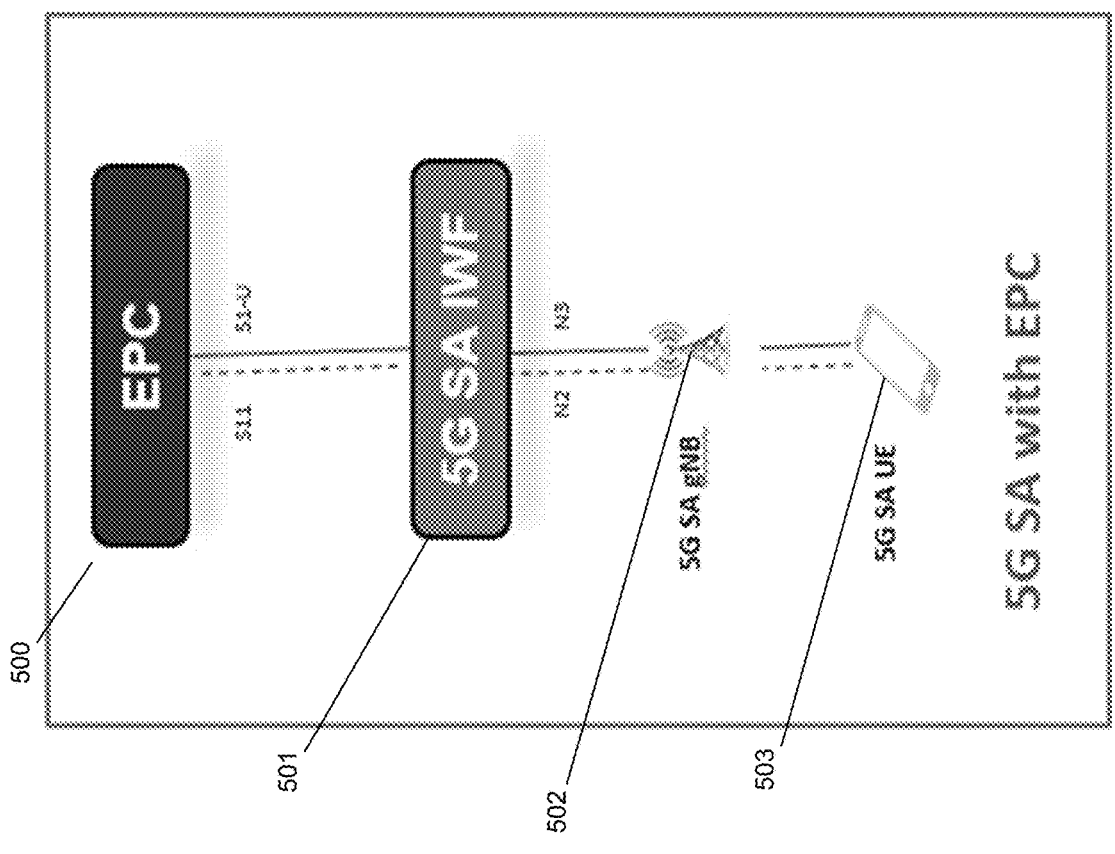
FIG. 5 is a diagram showing 5G SA with EPC, in accordance with some embodiments.

On EPC some of the 5G NSA features defined by 3GPP in Rel 15 will be needed and used. As shown in FIG. 5, an EPC 500 is in communication with a 5G Sa IUWF 501 which is in communication with a 5G SA gNB 502 which is in communication with a 5G SA UE 503. This solution doesn't need Dual connectivity feature as it anchors 5G SA gNB just like any other eNB. 5G SA IWF has the MME function which will then interact with SGW/PGW in the Operators existing EPC.

Figure 6:
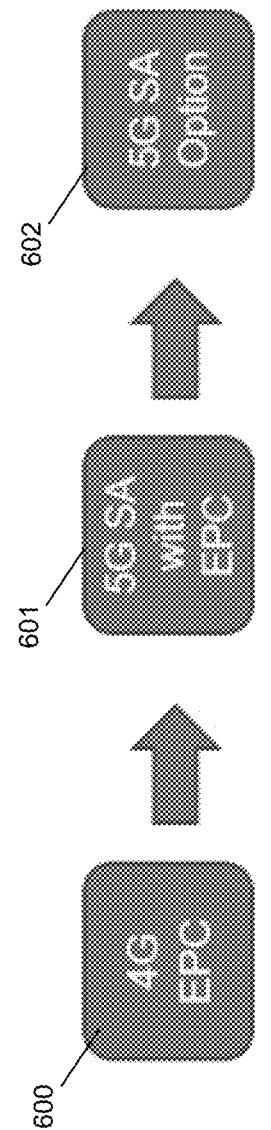
FIG. 6 is a diagram showing a migration path from 4G to 5G, in accordance with some embodiments.

FIG. 6 shows the migration path which begins with the 4G EPC 600, then intelligent 5G SA with EPC 601 then 5G SA option 602. An operator will launch 5G by introducing 5G SA gNBs (along with 5G SA IWF) in the network just like yet another eNB and thus launch 5G with minimal disruption. After that introduce 5G SA via option 2 or option 4/7. Advantages of this solution are: no need to have separate 5G NSA gNB and 5G NSA UEs; only 5G SA gNBs and 5G SA UEs can be used all along the migration path; no need to upgrade the 5G UEs or 5G gNBs once deployed; and the switch to 5G SA Core is much easier.

5G SA with EPC solution introduces a new function called "5G SA IWF" function. It will sit between the 5G SA gNB and EPC core. This function does the following: acts like an AMF towards the 5G SA gNB. It will terminate the N1/N2/N3 interfaces from 5G SA gNB; acts like an MME towards EPC core. It will have S11 and S1-U interfaces towards the SGW/PGW in the existing EPC core; MME function in 5G SA IWF will support standards based interfaces towards EPC and other network functions in the network; do the conversion and mapping between 5G SA NAS and 4G NAS, N2 and S1-AP, N3 and S1-U; handle the mapping of different parameters between 5G SA and 4G/LTE. QOS mapping, ID mappings like IMSI/SUPI, DNN/APN and so on. Mapping is defined in Annex C of 3GPP TS 23.502; manage the handovers between 5G SA gNB and other existing eNBs in the network in a similar way as LTE to LTE handover. Handover between 5G SA gNB and 2G/3G will not be supported; and handling charging for 5G access by using NR usage reporting feature. 5G SA IWF will generate the NR usage reports and send it to the EPC, who will then use it for charging as it does in 5G NSA.

On EPC and in MME in 5G SA IWF, following 5G NSA features defined by 3GPP in Rel 15 will be needed and used: Subscriber authentication: This feature is used to decide if a UE is allowed to access the 5G service. Based on UE capability, Support for EPC, subscription support and operator policy 5G service can be authorized for the subscriber.

5G UI Display control: This feature will help decide on when to display 5G Icon display on the 5G UE device once it is authorized to access while it is in 5G coverage.

High 5G Data rates: This will help support higher 5G throughput that can be supported by 5G NR.

5G Capable SGW/PGW selection: This feature will help MME to select SGW/PGW that are 5G Capable and can serve 5G sessions.

NR Usage reporting and charging: This feature will be used to support differentiated charging for traffic exchanged over 5G access.

Low Latency QOS with new QCIs: This will add support for new low latency QCIs that are newly introduced for low latency applications.

This solution doesn't need Dual connectivity feature as it anchors 5G SA gNB just like any other eNB towards MME in 5G SA IWF and then to EPC.

5G UEs are 5G SA UEs with support for 4G/LTE as fallback in case no 5G coverage. 5G SA UEs will attach to 5G coverage whenever available provided their subscription allows access to 5G access and is authorized by MME/HSS. When 5G UE moves out of the 5G coverage they will be handed over to 4G/LTE coverage by the 5G SA IWF function.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 7:
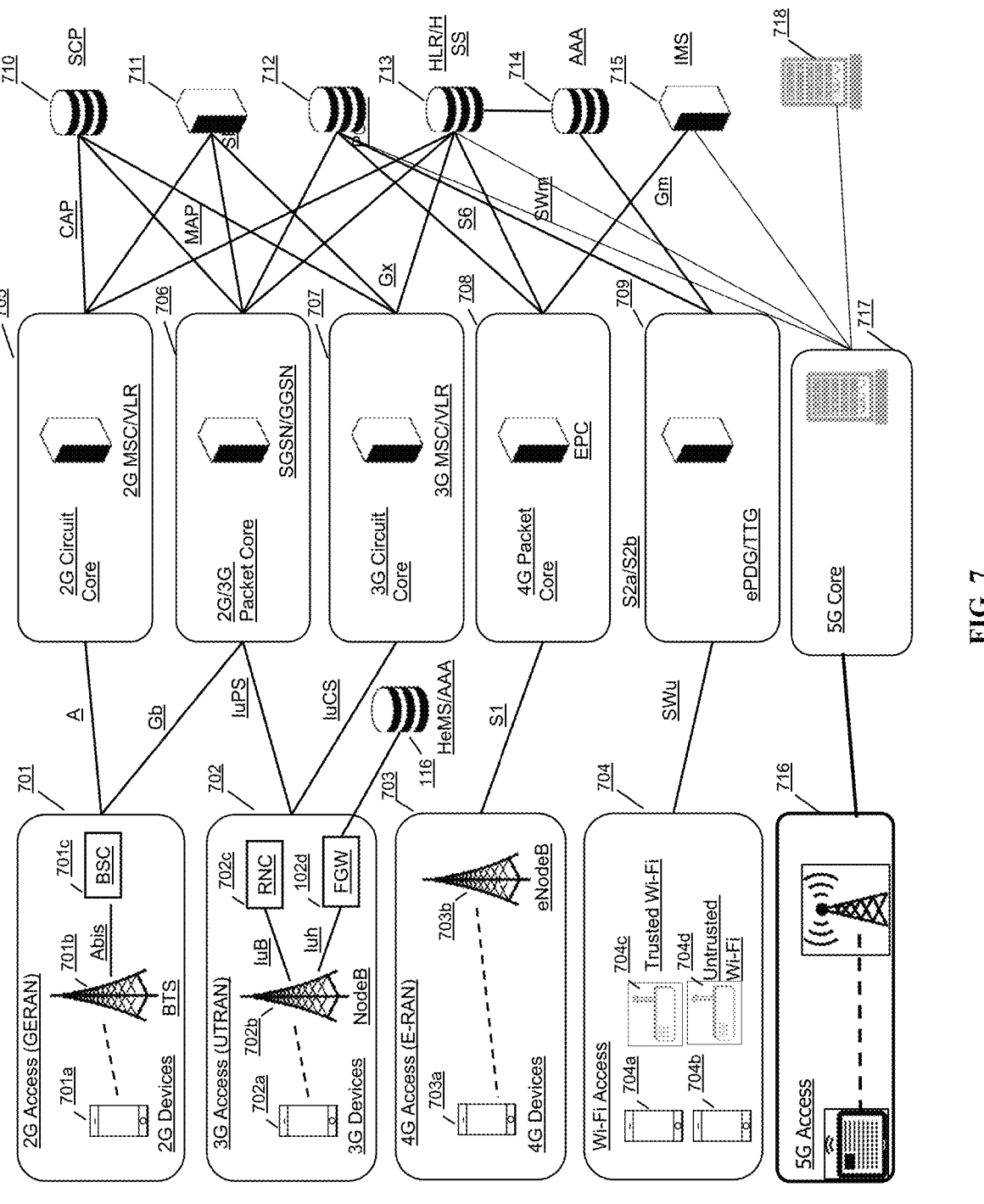
FIG. 7 is a schematic network architecture diagram for various radio access technology core networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 701, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703b. Wi-Fi is represented by Wi-Fi access network 704, which includes a trusted Wi-Fi access point 704c and an untrusted Wi-Fi access point 704d. The Wi-Fi devices 704a and 704b may access either AP 704c or 704d. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701c is required for Abis compatibility with BTS 701b, while for the 3G UTRAN, an RNC 702c is required for Iub compatibility and an FGW 702d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
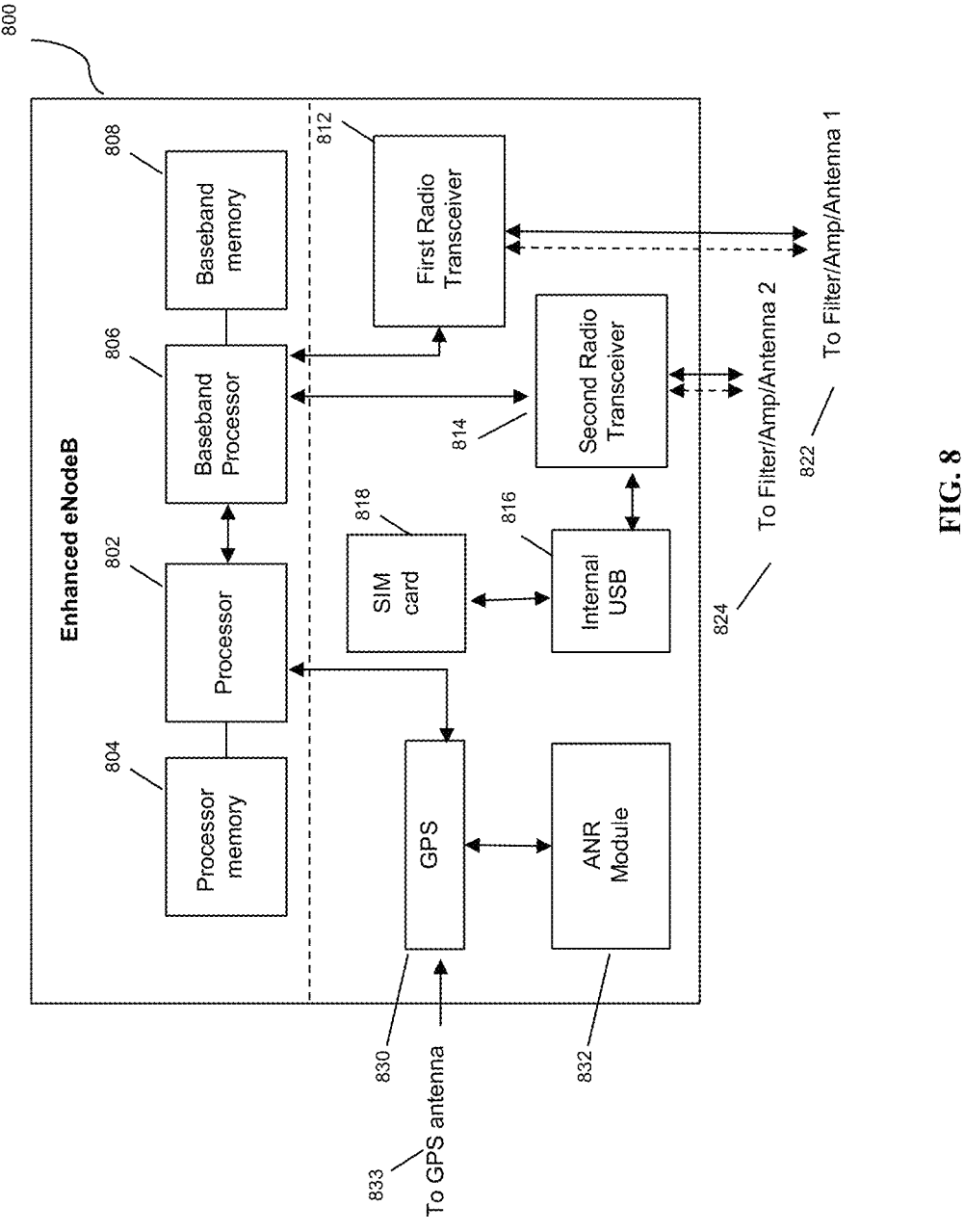
FIG. 8 is a schematic diagram of a coordinating gateway, in accordance with some embodiments.

FIG. 8 is a diagram for an enhanced eNodeB for performing the methods described herein, in accordance with some embodiments. Mesh network node 800 may include processor 802, processor memory 804 in communication with the processor, baseband processor 806, and baseband processor memory 808 in communication with the baseband processor.

Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
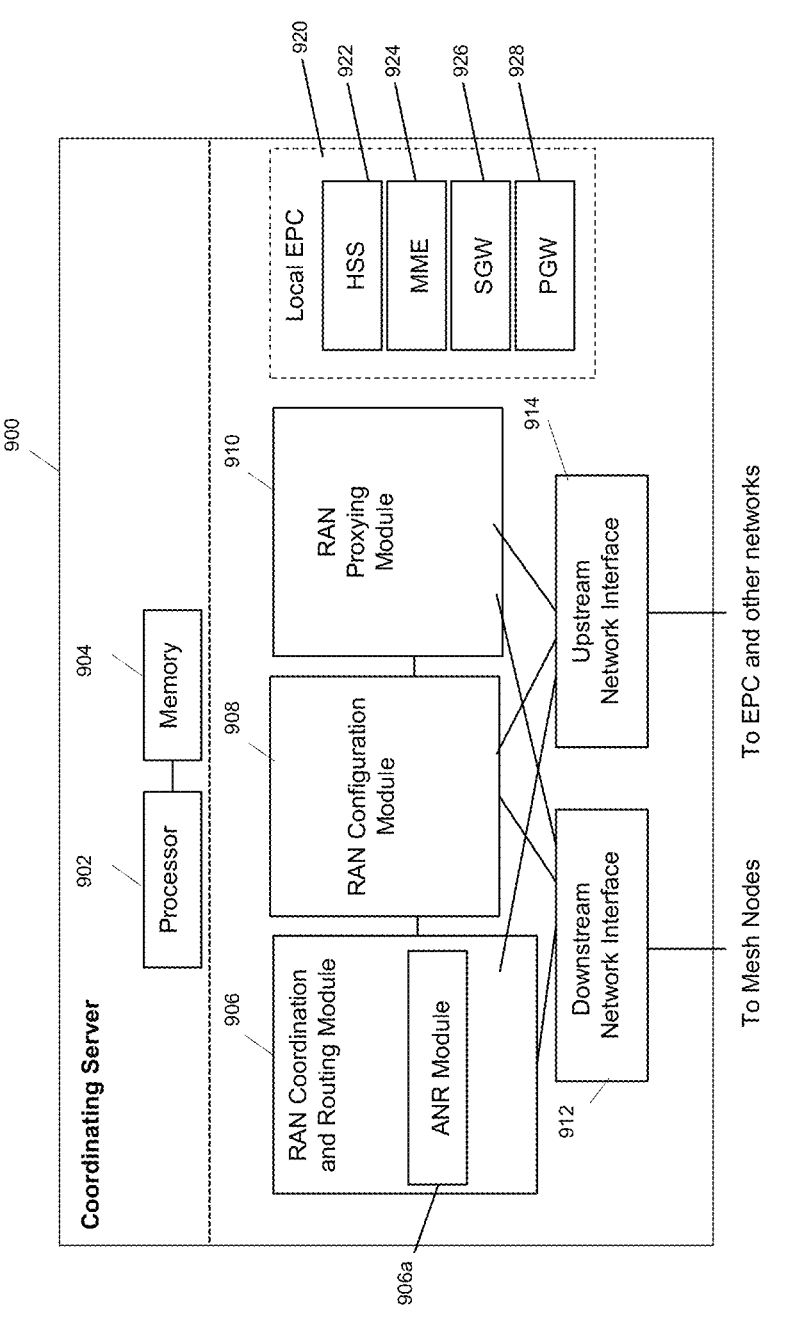
FIG. 9 is a schematic diagram of an enhanced base station, in accordance with some embodiments.

FIG. 9 is a diagram of a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G and Long Term Evolution (LTE) standards, one of skill in the art would understand that these systems and methods could be adapted for use with other wireless standards or versions thereof, including newer or older standards such as 2G, 3G, or future 5G or beyond.

The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a 5G mobile network, the method comprising:
   providing an Interworking Function (IWF) for interworking between a 5G standalone (SA) base station and a 4G Evolved Packet Core (EPC), wherein an N2 interface connects the IWF with the 5G SA base station and an S1 interface connects the IWF with a serving gateway (SGW) of the 4G EPC;
   interacting, by the IWF, with the 5G SA base station and with the 4G EPC;
   functioning, by the IWF, as an Access and Mobility Management Function (AMF) for the 5G SA base station and as a Mobility Management Entity (MME) of the 4G EPC;
   performing, by the IWF, mapping between 5G SA Non-Access Stratum (NAS) and 4G NAS, to facilitate anchoring the 5G SA base station at the 4G EPC without dual connectivity; and
   using, by the IWF, 5G Core (5GC) functions to support 4G EPC service for 5G user equipment devices (UEs), wherein using the 5GC functions to support the 4G EPC service includes using the 5GC functions to provide subscriber authentication and authorization of the 5G UEs.

2. The method of claim 1, further comprising providing the 5G SA base station.

3. The method of claim 1, further comprising performing, by the IWF, mapping between N2 and S1-AP, and between N3 and S1-U.

4. The method of claim 1, further comprising managing, by the IWF, handover between the 5G SA base station and a 4G eNB.

5. The method of claim 4, wherein the managing of handover comprises managing handover when a UE moves out of 5G coverage.

6. A system for providing a 5G mobile network, comprising:
   a 5G standalone (SA) base station;
   a 4G Evolved Packet Core (EPC);
   an Interworking Function (IWF) between the 5G SA base station and the 4G EPC,
   wherein an N2 interface connects the IWF with the 5G SA base station and an S1 interface connects the IWF with a serving gateway (SGW) of the 4G EPC,
   wherein the IWF interacts with the 5G SA base station and with the 4G EPC,
   wherein the IWF functions as an Access and Mobility Management Function (AMF) for the 5G SA base station and as a Mobility Management Entity (MME) of the 4G EPC,
   wherein the IWF maps between 5G SA Non-Access Stratum (NAS) and 4G NAS, to facilitate anchoring the 5G SA base station at the 4G EPC without dual connectivity, and
   wherein the IWF uses 5G Core (5GC) functions to support 4G EPC service for 5G user equipment devices (UEs), wherein using the 5GC functions to support the 4G EPC service includes using the 5GC functions to provide subscriber authentication and authorization of the 5G UEs.

7. The system of claim 6, wherein the IWF further maps between N2 and S1-AP, and between N3 and S1-U.

8. The system of claim 6, wherein the IWF manages handover between the 5G SA base station and a 4G eNB.

9. The system of claim 8, wherein the managing of handover comprises managing handover when a UE moves out of 5G coverage.

10. A non-transitory computer-readable medium containing instructions executable to cause an interworking function (IWF) to carry out operations, wherein the IWF is situated between a 5G standalone (SA) base station and a 4G Evolved Packet Core (EPC), wherein an N2 interface connects the IWF with the 5G SA base station and an S1 interface connects the IWF with a serving gateway (SGW) of the 4G EPC, and wherein the operations comprise:

interacting with the 5G SA base station and with the 4G EPC;

functioning as an Access and Mobility Management Function (AMF) for the 5G SA base station and as a Mobility Management Entity (MME) of the 4G EPC;

performing mapping between 5G SA Non-Access Stratum (NAS) and 4G NAS, to facilitate anchoring the 5G SA base station at the 4G EPC without dual connectivity, and using 5G Core (5GC) functions to support 4G EPC service for 5G user equipment devices (UEs), wherein using the 5GC functions to support the 4G EPC service includes using the 5GC functions to provide subscriber authentication and authorization of the 5G UEs.

11. The non-transitory computer-readable medium of claim 10, wherein the operations additionally comprise performing mapping between N2 and S1-AP, and between N3 and S1-U.

12. The non-transitory computer-readable medium of claim 10, wherein the operations additionally comprise managing handover between the 5G SA base station and a 4G eNB.

13. The non-transitory computer-readable medium of claim 12, wherein the managing of handover comprises managing handover when a UE moves out of 5G coverage.

* * * * *